United States Patent
Abou Rjeily

(10) Patent No.: US 7,817,715 B2
(45) Date of Patent: Oct. 19, 2010

(54) SPACE-TIME CODING METHOD FOR A UWB PULSE-TYPE MULTI-ANTENNA SYSTEM

(75) Inventor: Chadi Abou Rjeily, Zahle (LB)

(73) Assignee: Commissariat a l'Energie Atomique, Paris (FR)

( * ) Notice: Subject to any disclaimer, the term of this patent is extended or adjusted under 35 U.S.C. 154(b) by 697 days.

(21) Appl. No.: 11/695,276

(22) Filed: Apr. 2, 2007

(65) Prior Publication Data

US 2007/0237209 A1 Oct. 11, 2007

(30) Foreign Application Priority Data

Apr. 7, 2006 (FR) .................................. 06 51257

(51) Int. Cl.
  *H03K 7/04* (2006.01)
(52) U.S. Cl. ..................................... 375/239
(58) Field of Classification Search ................. 375/239, 375/260, 267, 130, 347, 348; 370/503, 509, 370/514; 343/893, 45
  See application file for complete search history.

(56) References Cited

U.S. PATENT DOCUMENTS

2003/0090435 A1* 5/2003 Santhoff et al. ............. 343/893
2004/0071222 A1* 4/2004 Liang et al. ................. 375/267

OTHER PUBLICATIONS

U.S. Appl. No. 12/443,919, filed Apr. 1, 2009, Abou Rjeily
U.S. Appl. No. 12/444,016, filed Apr. 2, 2009, Abou Rjeily.
Chadi Abou-Rjeily, et al., "On High Data Rate Space-Time Codes for Ultra-Wideband Systems", 2005 IEEE International Conference on Ultra-Wideband, XP002407730, Sep. 8, 2005, pp. 236-241.
Chadi Abou-Rjeily, et al., "A New Full Rate Full Diversity ST Code with Nonvanishing Determinant for TH-UWB Systems", 2006 International Zurich Seminar on Communications, XP002407731, Feb. 2006, pp. 198-201.
Chadi Abou-Rjeily, et al., "Space-Time Coding for Multiuser Ultra-Wideband Communications", Draft, Jan. 24, 2006, pp. 1-27.
Petros Elia, et al., "Perfect Space-Time Codes with Minimum and Non-Minimum Delay for Any Number of Antennas", Dec. 6, 2005, 14 pages.
Frédérique Oggier, et al., "Perfect Space Time Block Codes" Draft, Sep. 14, 2004, pp. 1-42.

* cited by examiner

*Primary Examiner*—Khai Tran
(74) *Attorney, Agent, or Firm*—Oblon, Spivak, McClelland, Maier & Neustadt, L.L.P.

(57) ABSTRACT

This invention relates to a space-time coding method for a UWB transmission system including three or four radiative elements. It also relates to a method for transmitting a plurality of data symbols belonging to a PPM modulation constellation or a PPM-PAM composite modulation constellation using this space-time coding.

24 Claims, 9 Drawing Sheets

TH-UWB

DS-UWB

TH-DS-UWB

SPACE-TIME CODING METHOD FOR A UWB PULSE-TYPE MULTI-ANTENNA SYSTEM

TECHNICAL FIELD

This invention relates both to the field of ultrawide band or UWB telecommunications and to that of multi-antenna systems with space-time coding or STC.

PRIOR ART

Wireless multi-antenna telecommunications systems are well known in the prior art. These systems use a plurality of antennas for transmission and/or reception and are called, according to the type of configuration used, MIMO (Multiple Input Multiple Output), MISO (Multiple Input Single Output) or SIMO (Single Input Multiple Output). Below, we will use the same term MIMO to refer to the aforementioned MIMO and MISO alternatives. The use of the spatial diversity in the transmission and/or reception enables these systems to provide channel capacities that are clearly superior to those of conventional single-antenna systems (or SISO for Single Input Single Output). This spatial diversity is generally complemented by time diversity by means of space-time coding. In such coding, a data symbol to be transmitted is coded on a plurality of antennas and at a plurality of transmission times. Two major categories of MIMO systems with space-time coding are known: space-time trellis coding systems or STTC and space-time block coding systems or STBC. In a trellis coding system, the space-time coder can be seen as a finite-state machine providing P transmission symbols to the P antennas according to the current state and the data symbol to be coded. The decoding upon reception is performed by a multidimensional Viterbi algorithm of which the complexity increases exponentially according to the number of states. In a block coding system, a block of data symbols to be transmitted is coded into a matrix of transmission symbols, with one dimension of the matrix corresponding to the number of antennas and the other corresponding to the consecutive transmission times.

FIG. 1 diagrammatically shows a MIMO transmission system 100 with STBC coding. A data symbol block $S=(a_1, \ldots, a_b)$ for example a binary word of b bits or more generally of b M-ary symbols is coded into a space-time matrix:

$$C = \begin{pmatrix} c_{1,1} & c_{1,2} & \ldots & c_{1,P} \\ c_{2,1} & c_{2,2} & \ldots & c_{2,P} \\ \vdots & \vdots & \ddots & \vdots \\ c_{T,1} & c_{T,2} & \ldots & c_{T,P} \end{pmatrix} \quad (1)$$

where the coefficients $c_{t,p}$, $t=1, \ldots, P$ of the code are as a general rule complex coefficients depending on the data symbols, P is the number of antennas used in the transmission, T is an integer indicating the time extension of the code, i.e. the number of times of use of the channel or PCUs (Per Channel Use).

The function $f$, which for every vector S of data symbols, maps the space-time code word C is called the coding function. If the function $f$ is linear, the space-time code is said to be linear. If the coefficients $c_{t,p}$ are real, the space-time code is said to be real.

In FIG. 1, reference 110 designates a space-time code. At each time of use of channel t, the coder provides the multiplexer 120 with the $t^{th}$ line vector of the matrix C. The multiplexer transmits to the modulators $130_1, \ldots, 130_P$ the coefficients of the line vector and the modulated signals are transmitted by the antennas $140_1, \ldots, 140_P$.

The space-time code is characterized by its rate, i.e. by the number of data symbols that it transmits per channel use (PCU). The code is said to be at full rate if it is P times higher than the relative rate of a single-antenna use (SISO).

The space-time code is also characterized by its diversity, which can be defined as the rank of the matrix C. There will be maximum diversity if, for any two code words $C_1$ and $C_2$ corresponding to two vectors $S_1$ and $S_2$, the matrix $C_1-C_2$ is of full rank.

The space-time code is finally characterized by its coding gain, which means the minimum distance between different code words. It can be defined as:

$$\min_{C_1 \neq C_2} \det((C_1 - C_2)^H (C_1 - C_2)) \quad (2)$$

or, in an equivalent manner, for a linear code:

$$\min_{C \neq 0} \det(C^H C) \quad (3)$$

where det(C) means the determinant of C and $C^H$ is the conjugated transposed matrix of C. For a data symbol transmission energy, the coding gain is bounded. A space-time code will be more resistant to fading the higher its coding gain is.

As a general rule, the coding gain is not set, but decreases with the order of data modulation, on which order the spectral efficacy is dependent. In some cases, when the spectral efficacy increases, the coding gain does not tend toward zero, but toward a non-zero asymptotic value. Such a code is said to be with non-vanishing determinants.

Finally, it is made sure that the average energy transmitted by the system is uniformly distributed between the antennas and the transmission times.

A perfect code is a full-rate code, with maximum diversity, with non-vanishing determinants and with energy distributed as described above.

Examples of perfect space-time codes for a MIMO system with 2, 3, 4 or 6 transmission antennas were proposed in the article of Freddrigue Oggier et al. entitled "Perfect space-time block codes" submitted for publication in IEEE Transactions on Information Theory and available at the website www-.comelec.enst.fr/~belfiore.

Thus, a perfect space-time code for a MIMO system with three transmission antennas is provided by the matrix:

$$C = \frac{1}{\sqrt{7}} \begin{pmatrix} u_0 a_1 + v_0 a_2 + w_0 a_3 & u_0 a_4 + v_0 a_5 + w_0 a_6 & u_0 a_7 + v_0 a_8 + w_0 a_9 \\ j(u_1 a_7 + v_1 a_8 + w_1 a_9) & u_1 a_1 + v_1 a_2 + w_1 a_3 & u_1 a_4 + v_1 a_5 + w_1 a_6 \\ j(u_2 a_4 + v_2 a_5 + w_2 a_6) & j(u_2 a_7 + v_2 a_8 + w_2 a_9) & u_2 a_1 + v_2 a_2 + w_2 a_3 \end{pmatrix} \quad (4)$$

with:

$$u_q = 1 + j + \theta_q;\ v_q = (1+j)\theta_q + \theta_q^2;\ w_q = 1 + 2\theta_q + j\theta_q^2;$$

$$\theta_q = 2\cos\left(\frac{2(q+1)\pi}{7}\right)\ \text{for}\ q = 0, 1, 2;\ j = \exp\left(\frac{2\pi i}{3}\right);\ i = \sqrt{-1}$$

and where $a_i$, $i=1, \ldots, 9$ are the data symbols.

Alternatives of perfect space-time codes have been proposed for any number of transmission antennas in the article of Petros Elia entitled "Perfect space-time codes with minimum and non-minimum delay for any number of antennas" published in IEEE Transactions on Information Theory on 6 December 2005.

Another telecommunications field is currently the subject of considerable research. It concerns UWB telecommunications systems, anticipated in particular for the development of future wireless personal networks (WPAN). These systems have the special feature of working directly on the base band with ultra wideband signals. Generally, a UWB signal is a signal conforming to the spectral mask stipulated in the regulations of the FCC of 14 Feb. 2002 and revised in March 2005, i.e. basically a signal in the spectral band 3.1 to 10.6 GHz and having a bandwidth of at least 500 MHz to −10 dB. In practice, there are two types of UWB signals: the multiband OFDM signals (MB-OFDM) and the UWB pulse-type signals. Below, we will discuss only the latter.

A UWB pulse signal is formed by very short pulses, typically on the order of a few hundred picoseconds, distributed in a frame. To reduce the multi-access interference (MAI for Multiple Access Interference), a distinct time-hopping code (TH for Time Hopping) is assigned to each user. The signal generated or intended for a user k can then be written in the form:

$$s_k(t) = \sum_{n=0}^{N_s-1} w(t - nT_s - c_k(n)T_c) \quad (5)$$

where w is the form of the basic pulse, $T_c$ is a chip duration, $T_s$ is the duration of a basic interval with $N_s=N_c T_c$ where $N_c$ is the number of chips in an interval, and the total frame has the duration $T_f=N_s T_s$ where $N_s$ is the number of intervals in the frame. The duration of the basic pulse is chosen to be lower than the chip duration, i.e. $T_w \leq T_c$. The sequence $C_k(n)$ for $n=0, \ldots, N_s-1$ defines the time-hopping code of the user k. The time-hopping sequences are chosen so as to minimise the number of collisions between pulses belonging to time-hopping sequences of different users.

FIG. 2A shows a TH-UWB signal associated with a user k. To transmit a given data symbol coming from or intended for a user k, the TH-UWB signal is generally modulated using a position modulation (PPM for Pulse Position Modulation), i.e. for the modulated signal:

$$s_k(t) = \sum_{n=0}^{N_s-1} w(t - nT_s - c_k(n)T_c - d_k\varepsilon) \quad (6)$$

where $\varepsilon$ is a modulation delay (dither) substantially shorter than the chip duration $T_c$ and $d_k \in \{0, \ldots, M-1\}$ is the M-ary PPM position of the symbol.

Alternatively, the data symbols can be transmitted by means of an amplitude modulation (PAM). In this case, the modulated signal can be written:

$$s_k(t) = \sum_{n=0}^{N_s-1} a^{(k)}.w(t - nT_s - c_k(n)T_c) \quad (7)$$

where $a^{(k)}=2m'-1-M'$ with $m'=1, \ldots, M'$, is the M'-ary symbol of the PAM modulation. It is possible, for example, to use a BPSK modulation (M'=2).

The PPM and PAM modulations can also be combined into a composite M.M'-ary modulation. The modulated signal then has the following general form:

$$s_k(t) = \sum_{n=0}^{N_s-1} \sum_{m=0}^{M-1} a_m^{(k)}.w(t - nT_s - c_k(n)T_c - m\varepsilon) \quad (8)$$

The alphabet of this modulation is of cardinal M.M' and has been shown in FIG. 3. For each of the M time positions, M' modulation amplitudes are possible. A symbol (d,a) of the alphabet can be represented by a sequence $a_m$, $m=0, \ldots, M-1$ with $a_m=\delta(m-d)a$ where d is a position of the PPM modulation, a is an amplitude of the PAM modulation and $\delta(.)$ is the Dirac distribution.

Instead of separating the different users by means of time-hopping codes, it is also possible to separate them by orthogonal codes, for example Hadamard codes, such as in DS-CDMA. Then, we are talking about DS-UWB (Direct Spread UWB). In this case, for the expression of the non-modulated signal, corresponding to (5), we have:

$$s_k(t) = \sum_{n=0}^{N_s-1} b_n^{(k)} w(t - nT_s) \quad (9)$$

where $b_n^{(k)}$, $n=0, \ldots N_s-1$ is the spreading sequence of the user k. It is noted that the expression (9) is analogous to that of a classic DS-CDMA signal. However, it differs therefrom by the fact that the chips do not occupy the entire frame, but are distributed in the period $T_s$. FIG. 2B shows a DS-UWB signal associated with a user k.

As above, the data symbols can be transmitted by means of a PPM modulation, a PAM modulation or a composite PPM-PAM modulation. The DS-UWB amplitude-modulated signal corresponding to the TH-UWB signal (7) can be expressed, using the same notations:

$$s_k(t) = \sum_{n=0}^{N_s-1} a^{(k)} b_n^{(k)} \cdot w(t - nT_s) \quad (10)$$

Finally, it is known to combine time-hopping codes and spectral spreading codes in order to offer multiple accesses to different users. Thus, we obtain a UWB pulse signal TH-DS-UWB with the general form:

$$s_k(t) = \sum_{n=0}^{N_s-1} b_n^{(k)} \cdot w(t - nT_s - c_k(n)T_c) \quad (11)$$

FIG. 2C shows a TH-DS-UWB signal associated with a user k. This signal can be modulated by a composite M.M'-ary PPM-PAM modulation. We then obtain for the modulated signal:

$$s_k(t) = \sum_{n=0}^{N_s-1} \sum_{m=0}^{M-1} d_m^{(k)} b_n^{(k)} \cdot w(t - nT_s - c_k(n)T_c - m\varepsilon) \quad (12)$$

It is known from the prior art to use UWB signals in MIMO systems. In this case, each antenna transmits a UWB signal modulated according to a data symbol or a block of such symbols (STBC).

The space-time coding techniques initially developed for narrowband signals or for DS-CDMA are difficult to apply to UWB pulse signals. Indeed, the known space-time codes, such as the perfect codes mentioned above, are generally with complex coefficients and consequently have phase information. However, it is extremely difficult to recover this phase information in a signal with a band as wide as that of UWB pulse signals. The very narrow time support of the pulses is much more suitable for position modulation (PPM) or amplitude modulation (PAM).

Space-time coding of UWB signals was proposed in the article of Chadi Abou-Rjeily et al. entitled "Space-Time coding for multiuser Ultra-Wideband communications" submitted for publication in IEEE Transactions on Communications, Sept. 2005 and available at www.tsi.enst.fr.

In accordance with the constraints mentioned above, the space-time coding proposed is real. Thus, for a configuration with three antennas at the transmission, it can be written:

$$C = \frac{1}{7} \begin{pmatrix} ua_1 + va_2 + wa_3 & 2^{\frac{1}{3}}(ua_4 + va_5 + wa_6) & 2^{\frac{2}{3}}(ua_7 + va_8 + wa_9) \\ 2^{\frac{2}{3}}(wa_7 + ua_8 + va_9) & wa_1 + ua_2 + va_3 & 2^{\frac{1}{3}}(wa_4 + ua_5 + va_6) \\ 2^{\frac{1}{3}}(va_4 + wa_5 + ua_6) & 2^{\frac{2}{3}}(va_7 + wa_8 + ua_9) & va_1 + wa_2 + ua_3 \end{pmatrix} \quad (13)$$

with $u=-2+2\theta_0+3\theta_0^2$; $v=-2+\theta_1+3\theta_1^2$; $w=-1+2\theta_2+3\theta_2^2$ where the values $\theta_0, \theta_1, \theta_2$ have been previously defined and where $S=(a_1,a_2,a_3,a_4,a_5,a_6,a_7,a_8,a_9)$ is a data symbol vector PAM, namely as $a_i \in \{-M'+1, \ldots, M'-1\}$.

This same article proposes generalising this space-time code to the coding of a block of data symbols belonging to a PPM-PAM alphabet. For a three-antenna transmission configuration, this code can be expressed by the matrix of size 3M×3:

$$C = \frac{1}{7} \begin{pmatrix} ua_{1,0} + va_{2,0} + wa_{3,0} & 2^{\frac{1}{3}}(ua_{4,0} + va_{5,0} + wa_{6,0}) & 2^{\frac{2}{3}}(ua_{7,0} + va_{8,0} + wa_{9,0}) \\ \vdots & \vdots & \vdots \\ ua_{1,M-1} + va_{2,M-1} + wa_{3,M-1} & 2^{\frac{1}{3}}(ua_{4,M-1} + va_{5,M-1} + wa_{6,M-1}) & 2^{\frac{2}{3}}(ua_{7,M-1} + va_{8,M-1} + wa_{9,M-1}) \\ 2^{\frac{2}{3}}(wa_{7,0} + ua_{8,0} + va_{9,0}) & wa_{1,0} + ua_{2,0} + va_{3,0} & 2^{\frac{1}{3}}(wa_{4,0} + ua_{5,0} + va_{6,0}) \\ \vdots & \vdots & \vdots \\ 2^{\frac{2}{3}}(wa_{7,M-1} + ua_{8,M-1} + va_{9,M-1}) & wa_{1,M-1} + ua_{2,M-1} + va_{3,M-1} & 2^{\frac{1}{3}}(wa_{4,M-1} + ua_{5,M-1} + va_{6,M-1}) \\ 2^{\frac{1}{3}}(va_{4,0} + wa_{5,0} + ua_{6,0}) & 2^{\frac{2}{3}}(va_{7,0} + wa_{8,0} + ua_{9,0}) & va_{1,0} + wa_{2,0} + ua_{3,0} \\ \vdots & \vdots & \vdots \\ 2^{\frac{1}{3}}(va_{4,M-1} + wa_{5,M-1} + ua_{6,M-1}) & 2^{\frac{2}{3}}(va_{7,M-1} + wa_{8,M-1} + ua_{9,M-1}) & va_{1,M-1} + wa_{2,M-1} + ua_{3,M-1} \end{pmatrix} \quad (14)$$

Each data symbol $a_i=(a_{i,0}, \ldots, a_{i,M-1})$ in this case is a vector representing an element of the PPM-PAM alphabet with $a_{i,n}=a_i\delta(m-d_i)$ where $a_i$ is an element of the PAM alphabet and $d_i$ is an element of the PPM alphabet. The block of data symbols coded by the code C is nothing else than $S=(a_1,a_2,a_3,a_4,a_5,a_6,a_7,a_8,a_9)$.

More specifically, the block of data symbols S gives way to the generation of UWB signals according to the expressions given below. To simplify the notations, we will consider a single-user use (thus no indexing by k, and no spreading sequence).

The antenna 1 transmits, for the duration of the first frame $T_f$, the signal, $$s^1(t) = \sum_{n=0}^{N_s-1} \sum_{m=0}^{M-1} (ua_{1,m} + va_{2,m} + wa_{3,m})w(t - nT_s - c(n)T_c - m\varepsilon) \quad (15)$$

which signal corresponds to the first column vector of the M first lines of the code (14).

The antenna 2 simultaneously transmits, for the duration of the first frame $T_f$, the signal:

$$s^2(t) = 2^{\frac{1}{3}} \sum_{n=0}^{N_s-1} \sum_{m=0}^{M-1} (ua_{4,m} + va_{5,m} + wa_{6,m})w(t - nT_s - c(n)T_c - m\varepsilon) \quad (16)$$

which signal corresponds to the second column vector of the M first lines of the code.

Finally, the antenna 3 simultaneously transmits, for the duration of the first frame $T_f$, the signal:

$$s^3(t) = 2^{\frac{2}{3}} \sum_{n=0}^{N_s-1} \sum_{m=0}^{M-1} (ua_{7,m} + va_{8,m} + wa_{9,m})w(t - nT_s - c(n)T_c - m\varepsilon) \quad (17)$$

which signal corresponds to the third column vector of the M first lines of the code.

Antenna 1 then transmits, for the duration of the second frame, again taking the time origin at the beginning of the frame:

$$s^1(t) = 2^{\frac{2}{3}} \sum_{n=0}^{N_s-1} \sum_{m=0}^{M-1} (wa_{7,m} + ua_{8,m} + va_{9,m})w(t - nT_s - c(n)T_c - m\varepsilon) \quad (18)$$

which signal corresponds to the first column vector of the M second lines of the code.

Antenna 2 simultaneously transmits, for the duration of the second frame, the signal:

$$s^2(t) = \sum_{n=0}^{N_s-1} \sum_{m=0}^{M-1} (wa_{1,m} + ua_{2,m} + va_{3,m})w(t - nT_s - c(n)T_c - m\varepsilon) \quad (19)$$

which signal corresponds to the second column vector of the M second lines of the code.

Finally, antenna 3 simultaneously transmits, for the duration of the second frame:

$$s^3(t) = 2^{\frac{1}{3}} \sum_{n=0}^{N_s-1} \sum_{m=0}^{M-1} (wa_{4,m} + ua_{5,m} + va_{6,m})w(t - nT_s - c(n)T_c - m\varepsilon) \quad (20)$$

which signal corresponds to the third column vector of the M second lines of the code.

Similarly, for the duration of the third frame, the signals transmitted by the three antennas are given respectively by:

$$s^1(t) = 2^{\frac{1}{3}} \sum_{n=0}^{N_s-1} \sum_{m=0}^{M-1} (va_{4,m} + wa_{5,m} + ua_{6,m})w(t - nT_s - c(n)T_c - m\varepsilon) \quad (21)$$

$$s^2(t) = 2^{\frac{2}{3}} \sum_{n=0}^{N_s-1} \sum_{m=0}^{M-1} (va_{7,m} + wa_{8,m} + ua_{9,m})w(t - nT_s - c(n)T_c - m\varepsilon) \quad (22)$$

$$s^3(t) = \sum_{n=0}^{N_s-1} \sum_{m=0}^{M-1} (va_{1,m} + wa_{2,m} + ua_{3,m})w(t - nT_s - c(n)T_c - m\varepsilon) \quad (23)$$

corresponding respectively to the first, second and third column vectors of the M last lines of the code.

The space-time code defined above has very good performance in terms of diversity. However, its coding gain is lower than that of the perfect code defined by (4). In addition, the scalar terms $2^{1/3}, 2^{2/3}$ appearing in the matrix (14) create, in each frame, an energy imbalance between the antennas.

The goal of this invention is to propose a real space-time code for a MIMO system with UWB pulse signals that has a coding gain greater than those of the codes known for such systems, in particular the code defined by (14) In addition, the goal of this invention is to provide a space-time code having, in each frame, a balanced energy distribution between the antennas.

DESCRIPTION OF THE INVENTION

This invention is defined by a space-time coding method for a UWB system including three radiative elements, in which a block of nine data symbols ($S=(a_1,a_2,a_3,a_4,a_5,a_6,a_7,a_8,a_9)$) belonging to a PPM modulation constellation or a PPM-PAM composite modulation constellation, having a number of time positions equal to 3 or greater than or equal to 5 is coded in nine vectors ($c_1^0, c_2^0, c_3^0, c_1^1, c_2^1, c_3^1, c_1^2, c_2^2, c_3^2$), wherein the components of a vector are intended to modulate a UWB pulse signal for a radiative element of said system and for a given transmission interval ($T_f$), each vector is obtained from a distinct linear combination of three of said data symbols, and a permutation of the components is applied to a subset of said vectors ($c_1^2, c_1^1, c_2^2$) before modulating said UWB pulse signal.

The invention also relates to a space-time coding device for implementing the method above, which device includes:

three basic modules, wherein each module is suitable for receiving three data symbols, each data symbol ($a_i$) is constituted by M components with M=3 or M≧5, each component can take M' values where M'≧1, each basic module includes at least one linear combination module, and each linear combination module is suitable for performing three distinct linear combinations of the components of the same rank of said three symbols so as to generate three respective components of the same rank of three intermediate vectors;

a plurality of permutation modules, wherein each permutation module is suitable for performing a permutation on the components of said intermediate vectors;

demultiplexing means receiving the components of said intermediate vectors or the components of these vectors permuted by the permutation modules in order to provide said nine vectors in a group of three by three consecutive times.

The invention is also defined by a space-time coding method for a UWB transmission system including four radiative elements, in which a block of sixteen data symbols (S=$(a_1, \ldots, a_{16})$) belonging to a PPM modulation constellation or a PPM-PAM composite modulation constellation, having a number of time positions equal to 3 or 5 or even greater than or equal to 7, is coded in sixteen vectors ($c_p^q$;p=1, ..., 4;q=0, ..., 3), wherein the components of a vector are intended to modulate a UWB pulse signal for a radiative element of said system and for a given transmission interval ($T_f$), each vector is obtained from a distinct linear combination of four of said data symbols, and a permutation of the components is applied to a subset of said vectors ($c_1^3, c_1^2, c_2^3, c_1^1, c_2^2, c_3^3$) before modulating said UWB pulse signal.

The invention finally relates to a space-time coding device for implementing the method described above, which device includes:

four basic modules, wherein each basic module is suitable for receiving four data symbols, each data symbol ($a_i$) is constituted by M components with M=3 or M=5 or M≧7, each component can take M' values where M'≧1, each basic module includes at least one linear combination module, and each linear combination module is suitable for performing four distinct linear combinations of the components of the same rank of said four symbols so as to generate four respective components of the same rank of four intermediate vectors;

a plurality of permutation modules, wherein each permutation module is suitable for performing a permutation on the components of said intermediate vectors;

demultiplexing means receiving the components of said intermediate vectors or the components of these vectors permuted by the permutation modules in order to provide said nine vectors in a group of four by four consecutive times.

BRIEF DESCRIPTION OF THE DRAWINGS

Other features and advantages will appear on reading the description of a preferred embodiment of the invention, in reference to the appended figures, in which.

DETAILED DESCRIPTION OF SPECIFIC EMBODIMENTS

Figure 1:
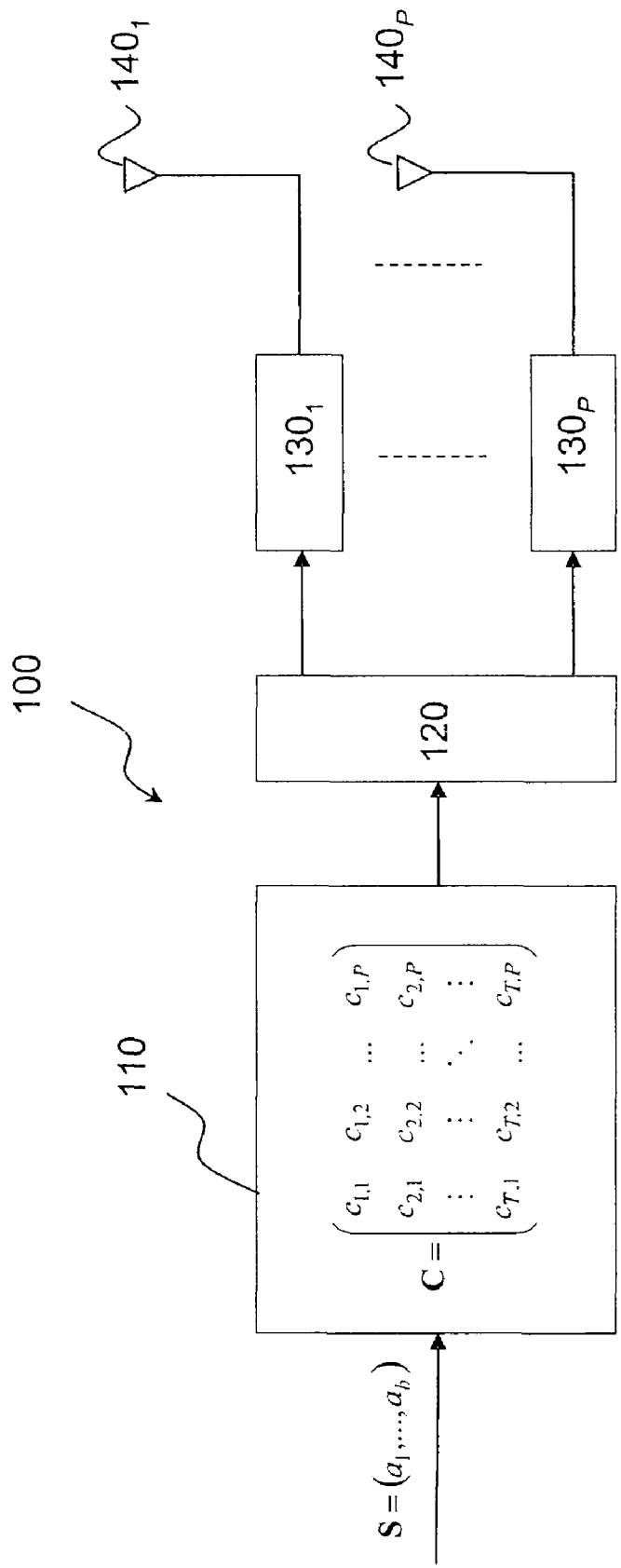
FIG. 1 diagrammatically shows a MIMO transmission system with STBC coding known from the prior art.
Figure 2A:
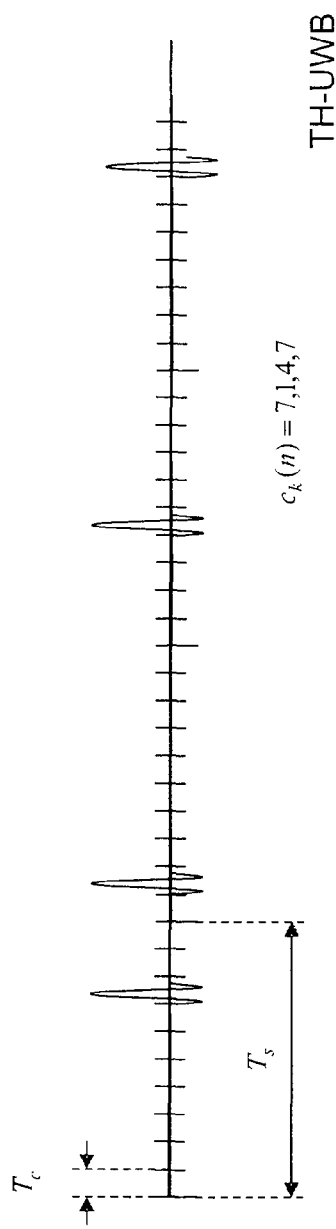
FIG. 2A to 2C show the respective forms of TH-UWB, DS-UWB and TH-DS-UWB signals.
Figure 2B:
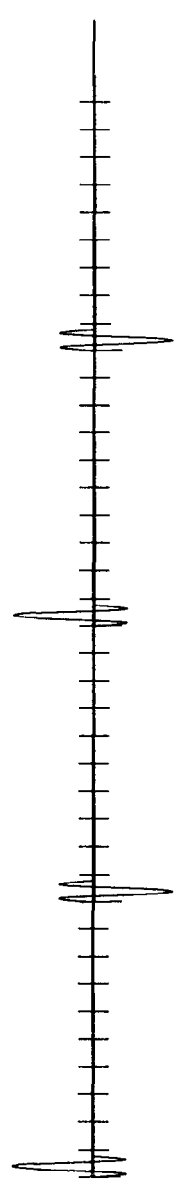
Figure 2C:
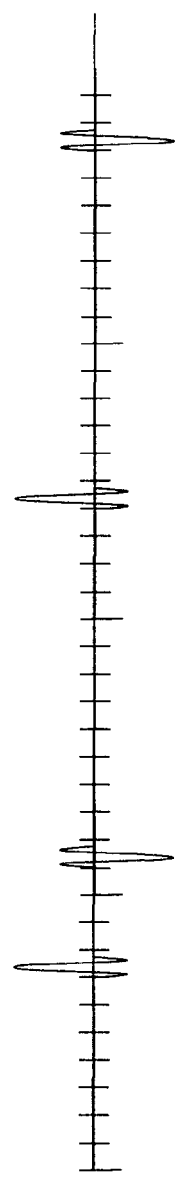

The basic idea of the invention is to create a space-time code without the complex values appearing in the perfect code (4), which are incompatible as mentioned with the use of UWB pulse signals, and scalar values $2^{1/3}, 2^{2/3}$ appearing in codes (13) and (14), at the origin of an imbalanced distribution of energy over the antennas.

The space-time code proposed is applied to MIMO systems with three or four transmission antennas using UWB pulse signals in which the data symbols are modulated using a PPM-PAM modulation with certain restrictions on the cardinal M of the PPM modulation. It is clear to a person skilled in the art that this type of modulation in particular includes only PPM modulations on the condition of the same restrictions. We will consider the case with three transmission antennas and the case with four transmission antennas.

For a 3-antenna system, the code proposed can be shown by the matrix of size 3M×3:

$$C = \frac{1}{7}\begin{pmatrix} ua_1 + va_2 + wa_3 & ua_4 + va_5 + wa_6 & ua_7 + va_8 + wa_9 \\ \Omega(wa_7 + ua_8 + va_9) & wa_1 + ua_2 + va_3 & wa_4 + ua_5 + va_6 \\ \Omega(va_4 + wa_5 + ua_6) & \Omega(va_7 + wa_8 + ua_9) & va_1 + wa_2 + ua_3 \end{pmatrix} \quad (24)$$

with the same notation conventions as for expression (13). The vectors $a_i = (a_{i,0}, \ldots, a_{i,M-1})$ i=1, ..., 9 are the data symbols and $\Omega$ is a permutation matrix of size M×M. For example, $\Omega$ is a simple circular shift:

$$\Omega = \begin{pmatrix} 0_{1 \times M-1} & 1 \\ I_{M-1 \times M-1} & 0_{M-1 \times 1} \end{pmatrix} = \begin{pmatrix} 0 & 0 & \cdots & 0 & 1 \\ 1 & 0 & \cdots & 0 & 0 \\ 0 & 1 & 0 & \cdots & \vdots \\ \vdots & \ddots & \ddots & \ddots & 0 \\ 0 & \cdots & 0 & 1 & 0 \end{pmatrix} \quad (25)$$

where $I_{M-1 \times M-1}$ is the identity matrix of size M−1, $0_{1 \times M-1}$ is the zero line vector of size M−1, and $0_{M-1 \times 1}$ is the zero column vector of size M−1.

As can be noted, the matrix C is real and does not have an unsymmetrical weight according to the antennas. It can be written more explicitly, for example for the expression of $\Omega$ given in (25):

$$C = \frac{1}{7}\begin{pmatrix} ua_{1,0} + va_{2,0} + wa_{3,0} & ua_{4,0} + va_{5,0} + wa_{6,0} & ua_{7,0} + va_{8,0} + wa_{9,0} \\ ua_{1,1} + va_{2,1} + wa_{3,1} & ua_{4,1} + va_{5,1} + wa_{6,1} & ua_{7,1} + va_{8,1} + wa_{9,1} \\ \vdots & \vdots & \vdots \\ ua_{1,M-1} + va_{2,M-1} + wa_{3,M-1} & ua_{4,M-1} + va_{5,M-1} + wa_{6,M-1} & ua_{7,M-1} + va_{8,M-1} + wa_{9,M-1} \\ wa_{7,M-1} + ua_{8,M-1} + va_{9,M-1} & wa_{1,0} + ua_{2,0} + va_{3,0} & wa_{4,0} + ua_{5,0} + va_{6,0} \\ wa_{7,0} + ua_{8,0} + va_{9,0} & wa_{1,1} + ua_{2,1} + va_{3,1} & wa_{4,1} + ua_{5,1} + va_{6,1} \\ \vdots & \vdots & \vdots \\ wa_{7,M-2} + ua_{8,M-2} + va_{9,M-2} & wa_{1,M-2} + ua_{2,M-2} + va_{3,M-2} & wa_{4,M-2} + ua_{5,M-2} + va_{6,M-2} \\ va_{4,M-1} + wa_{5,M-1} + ua_{6,M-1} & va_{7,M-1} + wa_{8,M-1} + ua_{9,M-1} & va_{1,0} + wa_{2,0} + ua_{3,0} \\ va_{4,0} + wa_{5,0} + ua_{6,0} & va_{7,0} + wa_{8,0} + ua_{9,0} & va_{1,1} + wa_{2,1} + ua_{3,1} \\ \vdots & \vdots & \vdots \\ va_{4,M-2} + wa_{5,M-2} + ua_{6,M-2} & va_{7,M-2} + wa_{8,M-2} + ua_{9,M-2} & va_{1,M-1} + wa_{2,M-1} + ua_{3,M-1} \end{pmatrix} \quad (26)$$

Figure 3:
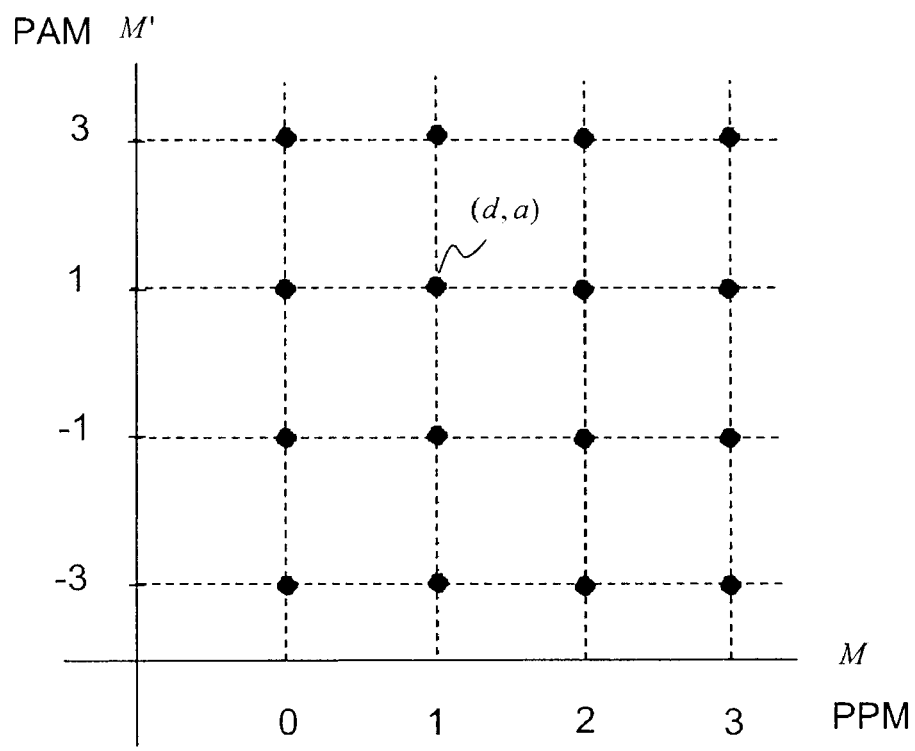
FIG. 3 shows an example of a PPM-PAN modulation constellation.

According to (26), we see that the effect of the multiplication by the matrix Ω involves a permutation on the first column vector of the M second lines and M last lines as well as on the second column vector of the M last lines of the matrix C. During the first frame (M first lines of C), the chronological order of the PPM positions is identical for the three antennas, while for the second frame (M second lines of C) and the third frame (M last lines of C) the PPM positions relative to symbols $a_7, a_8, a_9$, and those relative to symbols $a_4, a_5, a_6, a_7, a_8, a_9$, undergo a permutation with respect to the PPM positions of symbols $a_1, a_2, a_3$. In the example above, the permutation is a simple circular shift. In other words, in this specific case, everything happens as if, during the second frame, the PPM-PAM constellation of symbols $a_7, a_8, a_9$ and in the third frame the PPM-PAM constellation of symbols $a_4, a_5, a_6, a_7, a_8, a_9$ (as shown in FIG. 3) were subject to a cyclical rotation by one position to the right.

In general, the matrix ω is a permutation matrix of order M. The expressions (15) to (23), giving the UWB signals generated by the three antennas during the three consecutive frames, are then to be replaced by the next expressions (27) to (35), without regard for the normalisation factor 1/7:

first frame:

$$s^1(t) = \sum_{n=0}^{N_s-1} \sum_{m=0}^{M-1} (ua_{1,m} + va_{2,m} + wa_{3,m}) w(t - nT_s - c(n)T_c - m\varepsilon) \quad (27)$$

$$s^2(t) = \sum_{n=0}^{N_s-1} \sum_{m=0}^{M-1} (ua_{4,m} + va_{5,m} + wa_{6,m}) w(t - nT_s - c(n)T_c - m\varepsilon) \quad (28)$$

$$s^3(t) = \sum_{n=0}^{N_s-1} \sum_{m=0}^{M-1} (ua_{7,m} + va_{8,m} + wa_{9,m}) w(t - nT_s - c(n)T_c - m\varepsilon) \quad (29)$$

second frame:

$$s^1(t) = \sum_{n=0}^{N_s-1} \sum_{m=0}^{M-1} (wa_{7,\sigma(m)} + ua_{8,\sigma(m)} + va_{9,\sigma(m)}) w(t - nT_s - c(n)T_c - m\varepsilon) \quad (30)$$

$$s^2(t) = \sum_{n=0}^{N_s-1} \sum_{m=0}^{M-1} (wa_{1,m} + ua_{2,m} + va_{3,m}) w(t - nT_s - c(n)T_c - m\varepsilon) \quad (31)$$

$$s^3(t) = \sum_{n=0}^{N_s-1} \sum_{m=0}^{M-1} (wa_{4,m} + ua_{5,m} + va_{6,m}) w(t - nT_s - c(n)T_c - m\varepsilon) \quad (32)$$

third frame:

$$s^1(t) = \sum_{n=0}^{N_s-1} \sum_{m=0}^{M-1} (va_{4,\sigma(m)} + wa_{5,\sigma(m)} + ua_{6,\sigma(m)}) w(t - nT_s - c(n)T_c - m\varepsilon) \quad (33)$$

$$s^2(t) = \sum_{n=0}^{N_s-1} \sum_{m=0}^{M-1} (va_{7,\sigma(m)} + wa_{8,\sigma(m)} + ua_{9,\sigma(m)}) w(t - nT_s - c(n)T_c - m\varepsilon) \quad (34)$$

$$s^3(t) = \sum_{n=0}^{N_s-1} \sum_{m=0}^{M-1} (va_{1,m} + wa_{2,m} + ua_{3,m}) w(t - nT_s - c(n)T_c - m\varepsilon) \quad (35)$$

where σ is a permutation of the set $\{0, 1, \ldots, M-1\}$.

The matrix ω of the code proposed can still be a permutation matrix (circular or not) associated with a change in sign of any one or more than one of its elements. In the case of the example given in (25), the matrices:

$$\Omega = \begin{pmatrix} 0 & 0 & \cdots & 0 & \chi_0 \\ \chi_1 & 0 & \cdots & 0 & 0 \\ 0 & \chi_2 & 0 & \ddots & \vdots \\ \vdots & \ddots & \ddots & \ddots & 0 \\ 0 & \cdots & 0 & \chi_{M-1} & 0 \end{pmatrix} \quad (36)$$

with $\chi_i = \pm 1$, can also be used in the code C according to the invention. It is noted that a permutation associated with a sign reversal amounts to performing, in the PPM-PAM constellation (cf. FIG. 3), a mixing of PPM positions, and a symmetry with respect to the zero amplitude axis of the PAM constellation for the positions concerned by this reversal.

In addition, any permutation of lines and/or columns of the matrix (24) of the space-time code amounts to performing a simple permutation on the transmission intervals and/or the antennas and also results in a space-time code in the sense of the invention.

In addition, it is important to note that, regardless of the form of the code envisaged, any permutation on the indices of the symbols $a_i$ is still a space-time code in the sense of the invention, since such a permutation is equivalent to a simple time rearrangement in the block S.

The coefficients u,v,w of the matrix (24) were defined by $u=-2+2\theta_0 3\theta_0^2$, $v=-2+2\theta_1+3\theta_1^2$, $w=-2+2\theta_2+3\theta_2^2$. However, values proportional to these coefficients result in identical performances of the code. It is possible to move away from this proportionality constraint at the expense of impairment to the coding gain. It is important, however, that the ratios between the coefficients u,v,w be non-rational numbers, i.e.: $u,v,w \in R-Q$. It was possible to show that a deviation by ±10% of the proportionality did not significantly impair the performance of the space-time code, in other words if:

$$u = \lambda_0(-2 + 2\theta_0 + 3\theta_0^2),$$
$$v = \lambda_1(-2 + 2\theta_1 + 3\theta_1^2),$$
$$w = \lambda_2(-2 + 2\theta_2 + 3\theta_2^2) \text{ with}$$
$$0.9 \leq \frac{|\lambda_i - \lambda_{i'}|}{\lambda_i} \leq 1.1 \text{ for } i, i' \in \{0, 1, 2\}.$$

This tolerance makes it possible in particular to work with quantized coefficients, for example 8-bit bytes.

Regardless of the form of the code envisaged, it is real. It also makes it possible to transmit nine data symbols over three antennas for three uses of the channel, and, consequently, is at full rate. It can also be shown that the code has the maximum diversity for M=3 or M≧5 and ∀M'≧1. Finally, its coding gain is higher than that of the code defined by the expressions (13) and (14).

Figure 4:
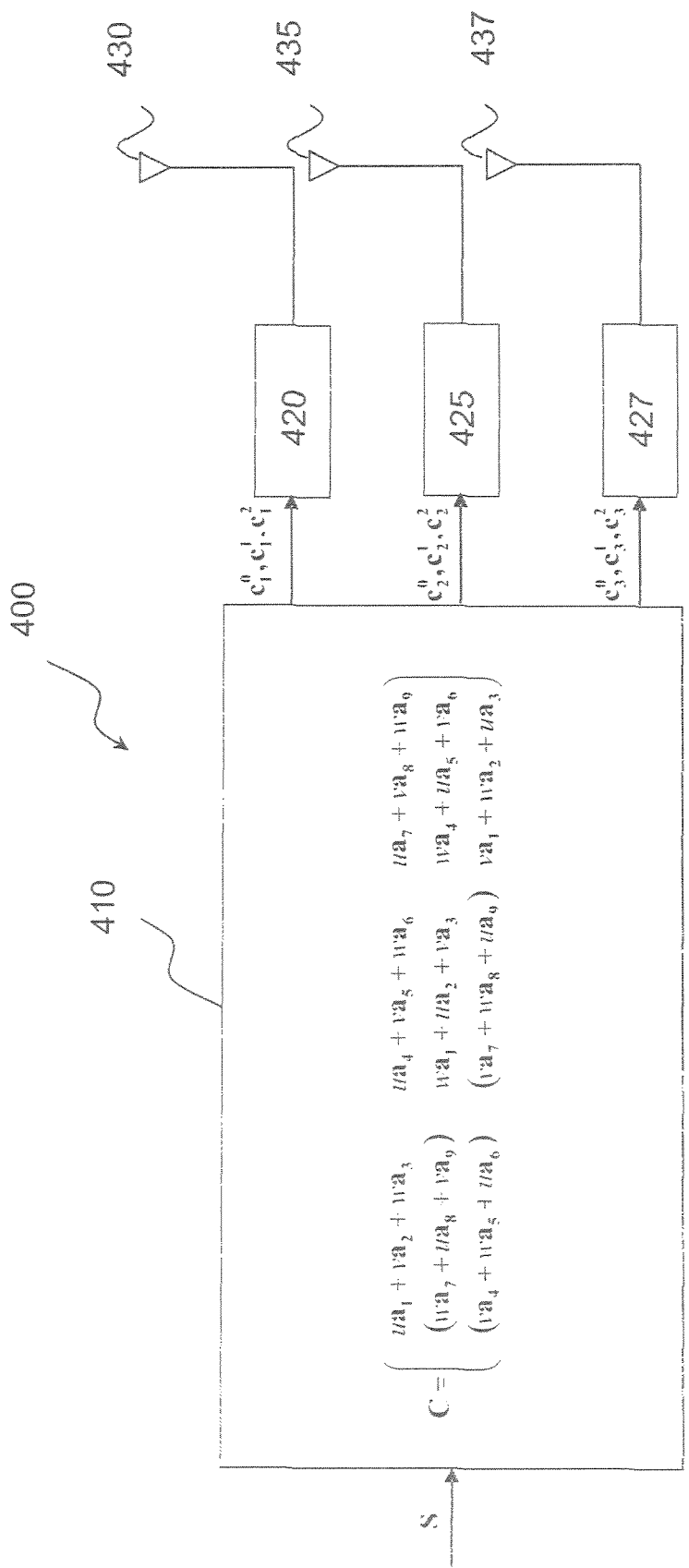
FIG. 4 diagrammatically shows a MIMO transmission system using a first space-time coding according to the invention.

FIG. 4 shows an example of a transmission system using the space-time coding according to the invention.

The system 400 receives data symbols by block $s=(a_1,a_2,a_3,a_4,a_5,a_6,a_7,a_8,a_9)$ where the $a_i$ are symbols of a PPM-PAM constellation. Alternatively, the data symbols can come from another M.M'-ary constellation on the condition that they are first subjected to mapping in the PPM-PAM constellation. Of course, the data symbols can result from one or more operations well known to a person skilled in the art, such as source coding, convolutional-type channel coding, by block or by series or parallel turbocoding, interleaving, and so on.

The data symbol block undergoes a coding operation in the space-time coder 410. More specifically, the module 410 calculates the coefficients of the matrix C according to (24) or according to the alternatives mentioned above. The three column vectors $c_1^0,c_2^0,c_3^0$ constituted by the M first lines of C are transmitted respectively to the UWB modulators 420, 425, 427 for the first frame, then the three column vectors $c_1^1,c_2^1,c_3^1$ constituted by the M next lines of C, for the second frame, and finally three column vectors $c_1^2,c_2^2,c_3^2$ constituted by the M last lines of C, for the third frame. The upper index in this case designates the frame and the lower index represents the radiative element 430, 435 or 437. The UWB modulator 420 generates, on the basis of vectors $c_1^0,c_1^1,c_1^2$, the corresponding modulated UWB pulse signals. Similarly, the UWB modulators 425 and 427 respectively generate, on the basis of vectors $c_2^0,c_2^1,c_2^2$ and $c_3^0,c_3^1,c_3^2$, the corresponding modulated UWB pulse signals. For example, if we use the space-time coding matrix (24) as indicated in the figure, the UWB modulator 420 successively provides the signals (27), (30) and (33), while the UWB modulator 425 successively provides signals (28), (31) and (34) and the UWB modulator 427, successively provides signals (29), (32) and (35). In general, the UWB pulse signals used to support the modulation can be of the TH-UWB, DS-UWB or TH-DS-UWB type. The UWB pulse signals thus modulated are then transmitted to the radiative elements 430, 435 and 437. These radiative elements can be UWB antennas or laser diodes or LEDs, functioning, for example, in the infrared domain, associated with electro-optic modulators. The transmission system proposed can then be used in the field of wireless optical telecommunications.

Figure 5:
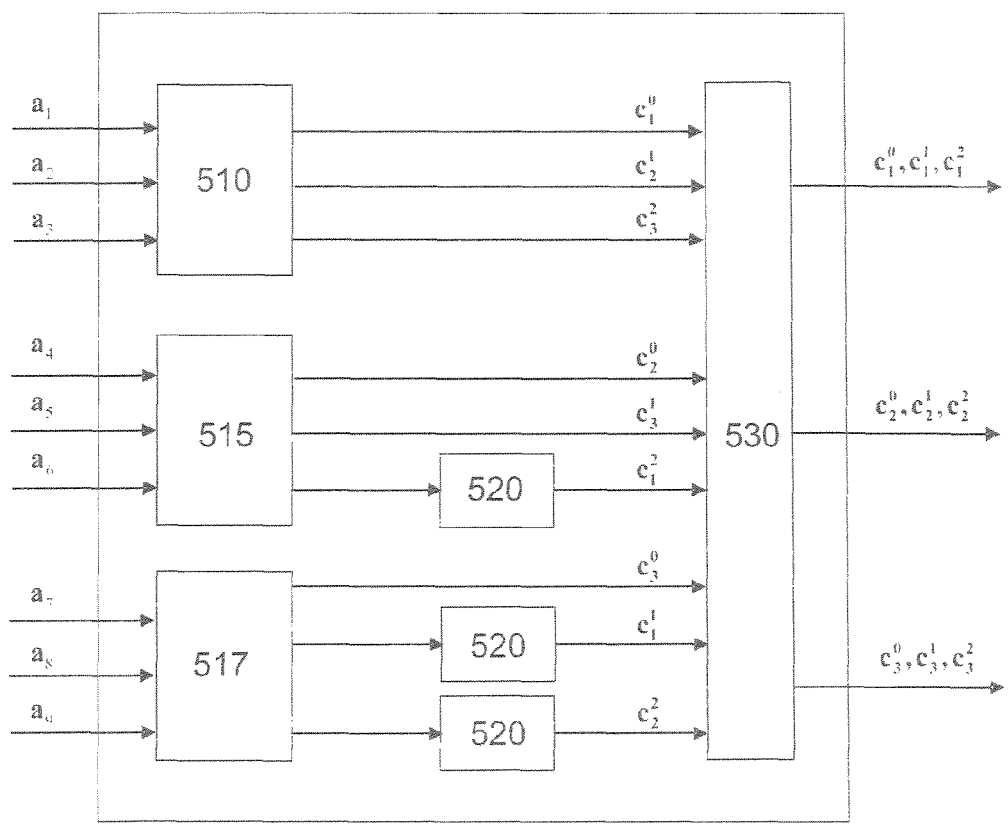
FIG. 5 diagrammatically shows the structure of a first space-time coder according to an embodiment of the invention.

FIG. 5 shows an advantageous embodiment of a space-time coder 410 of FIG. 4. The coder uses basic modules 510, 515, 517 with three inputs and three outputs, permutation modules 520 and a demultiplexer 530 with nine inputs and three outputs. Each basic module 510, 515, 517 has the structure shown in FIG. 6. This basic module includes three serial-parallel converters 610, three parallel-serial converters 630 and M linear combination modules 620. According to an embodiment, these modules 620 each perform the following linear operation:

$$X=ux+vy+wz$$
$$Y=wx+uy+vy \quad (37)$$
$$Z=vx+wy+uz$$

where all of the values are scalar; x,y,z are the input values; X,Y,Z are the output values.

The modules 620 can be constituted by wired multipliers and adders or the can be produced by means of microsequenced operations.

The serial-parallel converters 610 convert a sequence of M successive PAM symbols into a vector of size M. Conversely, the parallel-serial converters 630 convert a vector of size M (PPM-PAM symbol) into a sequence of M successive PAM symbols.

Figure 7:
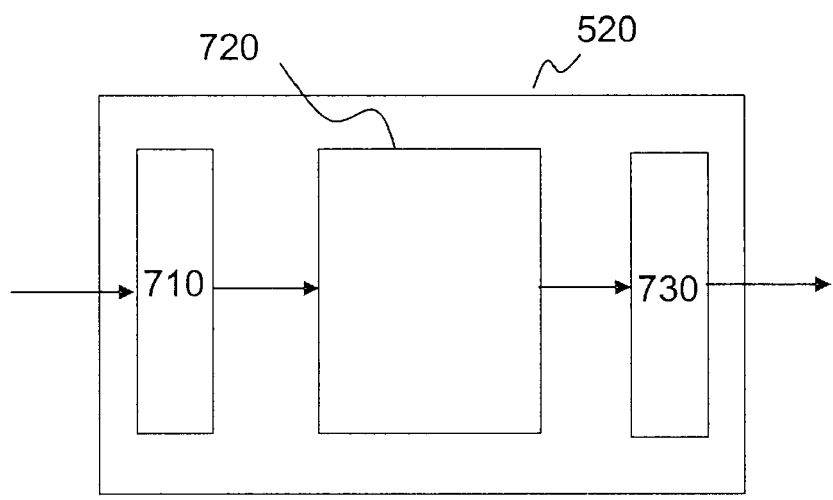
FIG. 7 diagrammatically shows the structure of a permutation module useful for producing the space-time coder of FIG. 5.

The permutation modules 520 of FIG. 5 have the structure shown in FIG. 7. Each permutation module has an input and an output. A serial-parallel converter transforms a sequence of M PAM input symbols into a word constituted by M symbols, representing a PPM-PAM symbol. Conversely, at the output, after the symbols of the word have been permuted in module 720, the parallel-serial converter transforms the word into a sequence of M successive PAM symbols.

The demultiplexer 530 of FIG. 5 receives the PPM-PAM symbols of the space-time code (more specifically the corresponding PAM symbols) coming from the basic modules 510, 515, 517, as the case may be after permutation in the modules 520 (thus, the symbols $c_1^2,c_1^1,c_2^2$ are obtained after permutation) and transmits them to the UWB modulators at the required transmission time. To do this, the demultiplexer 530 can include FIFO buffers in order to delay the components of the symbols to be transmitted during the second and third frames.

If sign reversals are present in the matrix Ω, they can be taken into account by changing the sign(s) of the coefficients u,v,w in modules 515 and 517, relative to the components concerned. More specifically, the change in sign will be performed in the linear combination modules 620 of modules 515 and 517.

Figure 6:
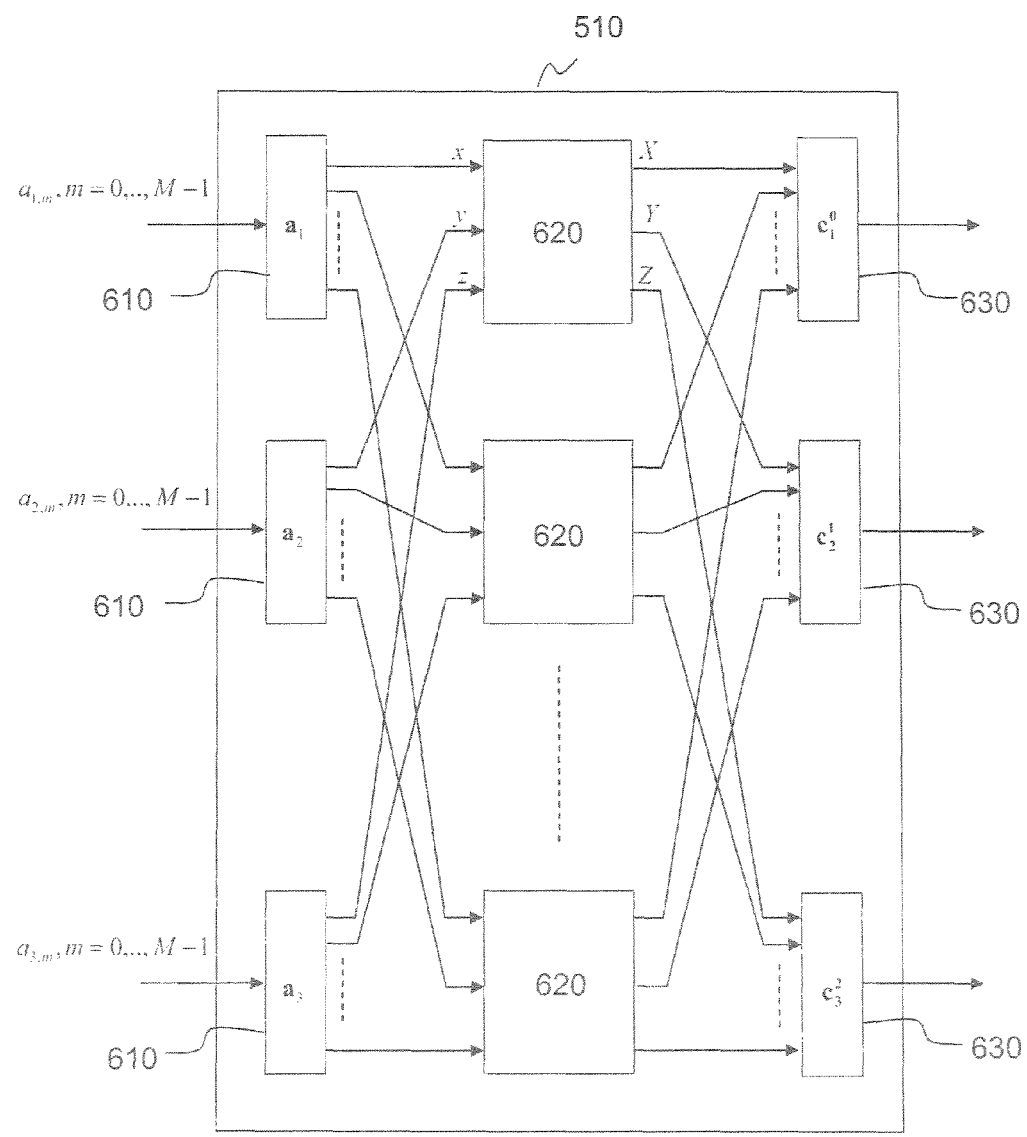
FIG. 6 diagrammatically shows the structure of a basic module useful for producing the space-time coder of FIG. 5.

The embodiment shown in FIGS. 5-7 uses a serialisation of the components of the PPM-PAM symbols between the different modules, in particular between modules 515, 517 and 520 and between modules 520 and 530. However, it is clear to a person skilled in the art that numerous architectural embodiments can be envisaged according to the degree of parallelism desired. For example, the exchanges between the different modules can be performed symbol by symbol, in which case the serial-parallel and parallel-serial converters can be entirely or partially suppressed. It is also possible to use a single linear combination module 620 in the basic modules by multiplexing the inputs and demultiplexing the outputs at a rate triple that of the components.

The case of a space-time coding for a MIMO system with four transmission antennas is considered below. The space-time code proposed is defined by the matrix of size 4M×4:

$$C = \frac{1}{\sqrt{15}} \begin{pmatrix} c_1^0 & c_2^0 & c_3^0 & c_4^0 \\ c_1^1 & c_2^1 & c_3^1 & c_4^1 \\ c_1^2 & c_2^2 & c_3^2 & c_4^2 \\ c_1^3 & c_2^3 & c_3^3 & c_4^3 \end{pmatrix} \quad (38)$$

with:

$c_1^0 = u_0 a_1 + v_0 a_2 + w_0 a_3 + t_0 a_4$ $c_1^1 = \Omega(u_1 a_{13} + v_1 a_{13} + w_1 a_{15} + t_1 a_{16})$ $c_1^2 = \Omega(u_2 a_9 + v_2 a_{10} + w_2 a_{11} + t_2 a_{12})$ $c_1^3 = \Omega(u_3 a_5 + v_3 a_6 + w_3 a_7 + t_3 a_8)$ $c_2^0 = u_0 a_5 + v_0 a_6 + w_0 a_7 + t_0 a_8$ $c_2^1 = u_1 a_1 + v_1 a_2 + w_1 a_3 + t_1 a_4$ $c_2^2 = \Omega(u_2 a_{13} + v_2 a_{13} + w_2 a_{15} + t_2 a_{16})$ $c_2^3 = \Omega(u_3 a_9 + v_3 a_{10} + w_3 a_{11} + t_3 a_{12})$ $c_3^0 = u_0 a_9 + v_0 a_{10} + w_0 a_{11} + t_0 a_{12}$ $c_3^1 = u_1 a_5 + v_1 a_6 + w_1 a_7 + t_1 a_8$ $c_3^2 = u_2 a_1 + v_2 a_2 + w_2 a_3 + t_2 a_4$ $c_3^3 = \Omega(u_3 a_{13} + v_3 a_{13} + w_3 a_{15} + t_3 a_{16})$ $c_4^0 = u_0 a_{13} + v_0 a_{13} + w_0 a_{15} + t_0 a_{16}$ $c_4^1 = u_1 a_9 + v_1 a_{10} + w_1 a_{11} + t_1 a_{12}$ $c_4^2 = u_2 a_5 + v_2 a_6 + w_2 a_7 + t_2 a_8$ $c_4^3 = u_3 a_1 + v_3 a_2 + w_3 a_3 + t_3 a_4$ $u_q = 1; \; v_q = -1 - 3\phi_q + \phi_q^2 + \phi_q^3;$ $w_q = -1 - 2\phi_q + \phi_q^2 + \phi_q^3;$ $t_q = -1 + 3\phi_q - \phi_q^3;$ $\phi_q = 2\cos\left(\frac{2(q+1)\pi}{15}\right) \text{ for } q = 0, \ldots, 3.$ which index designates the transmission frame. The vectors $a_i = (a_{i,0}, \ldots, a_{i,M-1}) \; i = 1, \ldots, 16$ are the data symbols of S and $\Omega$ is a permutation matrix of size M×M.

The alternatives considered for the space-time code with three transmission antennas is applied as above, namely the coefficient sign reversal in the matrix $\Omega$, permutation of lines and columns in C, and permutation of data symbol indices $a_i$. In addition, it is possible to choose coefficients proportional to the values $u_q, v_q, w_q, t_q$ above or substantially proportional to these values with a margin of error of ±10% without substantial impairment of the code performance.

Regardless of the form of the code considered, it is real. It also enables sixteen data symbols to be transmitted over four antennas for four uses of the channel and, consequently, is at full rate. It can also be shown that the code has maximum diversity for M=3, M=5 or M≧7 and ∀M'≧1. Finally, its coding gain is higher than that known in the prior art.

Figure 8:
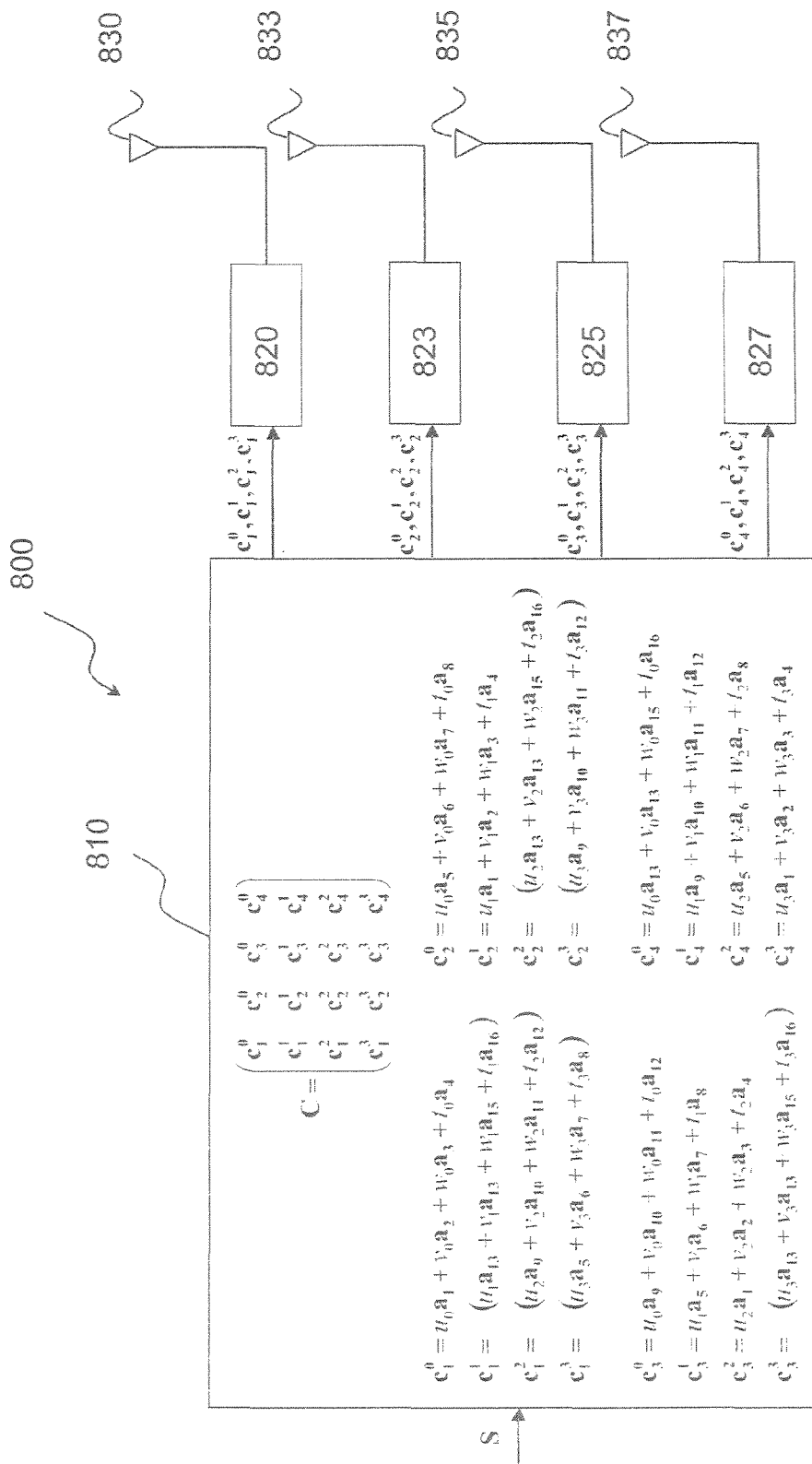
FIG. 8 diagrammatically shows a MIMO transmission system using a second space-time coding according to the invention.

FIG. 8 shows an example of a transmission system using the space-time coding with four antennas according to the invention.

The system 800 receives data symbols by a block S of 16 symbols. The data symbol block is subjected to a coding operation in the space-time coder 810. More specifically, the module 810 calculates the coefficients of the matrix C according to (38) or according to the alternatives considered above. The four column vectors $c_1^0, c_2^0, c_3^0, c_4^0$ constituted by the M first lines of C are transmitted respectively to the UWB modulators UWB 820, 823, 825, 827 for the first frame, then the four column vectors $c_1^2, c_2^1, c_3^1, c_4^1$ constituted by the M next lines of C, for the second frame, then the four column vectors $c_1^2, c_2^2, c_3^2, c_4^2$ constituted by the next M lines of C, for the third frame, and finally the four column vectors $c_1^3, c_2^3, c_3^3, c_4^3$ constituted by the M last lines of C, for the fourth frame. The upper index in this case designates the frame and the lower index represents the radiative element 830, 833, 835 or 837. The UWB modulator 820 generates, on the basis of the vectors $c_1^0, c_1^1, c_1^2, c_1^3$, the corresponding modulated UWB pulse signals. Similarly, the UWB modulators 823, 825 and 827 respectively generate, on the basis of vectors $c_2^0, c_2^1, c_2^2, c_2^3$, $c_3^0, c_3^1, c_3^2, c_3^3$ and $c_4^0, c_4^1, c_4^2, c_4^3$ the corresponding modulated UWB pulse signals. The UWB pulse signals used to support the modulation can also be of the TH-UWB, DS-UWB or TH-DS-UWB type. The UWB pulse signals thus modulated are then transmitted to the radiative elements 830, 833, 835 and 837.

Figure 9:
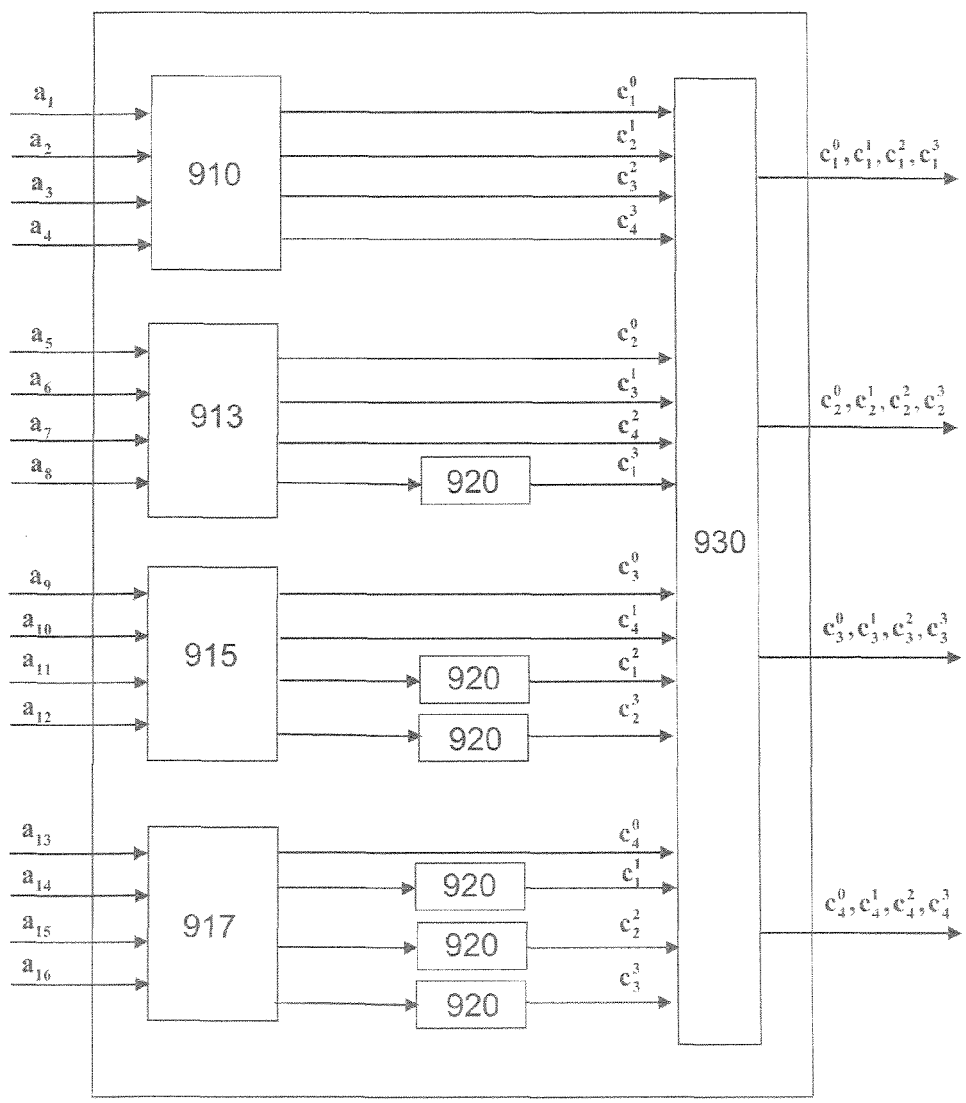
FIG. 9 diagrammatically shows the structure of a second space-time coder according to an embodiment of the invention.
Figure 10:
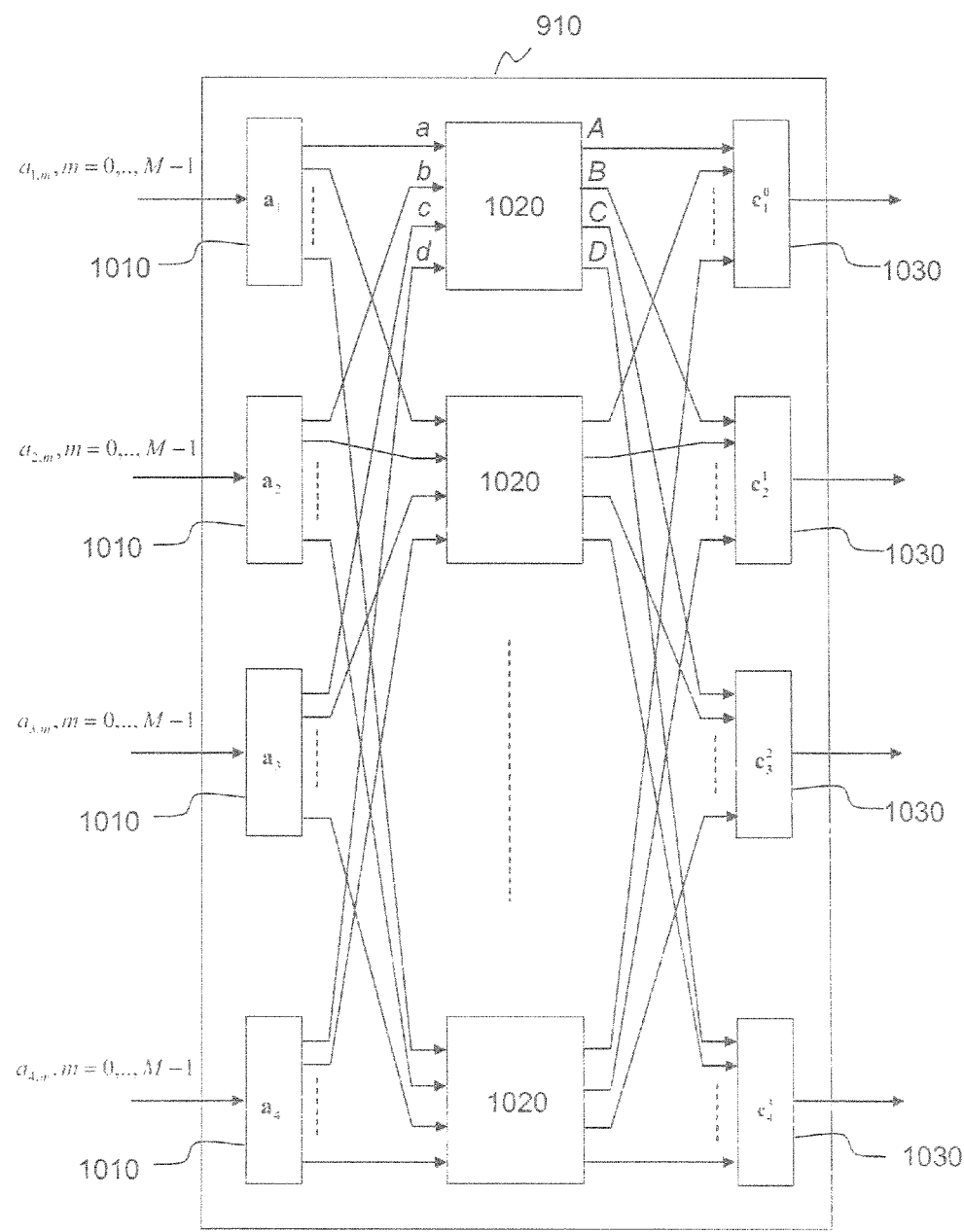
FIG. 10 diagrammatically shows the structure of a basic module useful for producing the space-time coder of FIG. 9.

FIG. 9 shows an advantageous embodiment of the space-time coder 810 of FIG. 8. The coder uses basic modules 910, 913, 915, 917 with four inputs and four outputs, permutation modules 920 and a demultiplexer 930 with sixteen inputs and four outputs. Each basic module 910, 913, 915, 917 has the structure shown in FIG. 10. This basic module includes four serial-parallel converters 1010, four parallel-serial converters 1030 and M linear combination modules 1020. According to an embodiment, these modules 1020 each perform the following linear operation:

$A = u_0 a + v_0 b + w_0 c + t_0 d$ $B = u_1 a + v_1 b + w_1 c + t_1 d$ \hfill (39)

$C = u_2 a + v_2 b + w_2 c + t_2 d$ $D = u_3 a + v_3 b + w_3 c + t_3 d$ where all of the values are scalar; a, b, c, d are the input values; A, B, C, D are the output values.

As above, the modules 1020 can be constituted by wired multipliers and adders or they can be produced by means of microsequenced operations.

The serial-parallel converters 1010 convert a sequence of M successive PAM symbols into a vector of size M. Conversely, the parallel-serial converters 1030 convert a vector of size M (PPM-PAM symbol) into a sequence of M successive PAM symbols.

The permutation modules 930 of FIG. 9 have the structure shown in FIG. 5 and will not, therefore, be described in greater detail.

The demultiplexer 930 of FIG. 9 receives the PPM-PAM symbols of the space-time code (more specifically the corresponding PAM symbols) coming from the basic modules 910, 913, 915, 917, as the case may be after permutation in the modules 920 (for the symbols $c_1^3, c_1^2, c_2^3, c_1^1, c_2^2, c_3^3$) and transmits them to the UWB modulators at the required transmission time. To do this, the demultiplexer 930 can include FIFO buffers in order to delay the components of the symbols to be transmitted during the second, third and fourth frames.

If sign reversals are present in the matrix $\Omega$, they can be taken into account by changing the sign(s) of the coefficients $u_k, v_k, w_k, t_k$ in the modules 913, 915 and 917, relative to the component(s) concerned. More specifically, the sign change will be performed in the linear combination modules 1020 of the latter.

Of course, in this case as well, depending on the desired degree of parallelism, the serial-parallel and parallel-serial converters can be entirely or partially suppressed. It is also possible to use a single linear combination module for each basic module by performing a multiplexing of the components at the input and a demultiplexing at the output of 1020 at a rate four times that of said components.

The UWB signals transmitted by the system shown in FIG. 4 or FIG. 8 can be processed by a multi-antenna receiver in a conventional manner. The receiver can, for example, include a Rake correlation stage followed by a decision stage, using, for example, a sphere decoder known to a person skilled in the art.

The invention claimed is:

1. A space-time coding method for an ultra-wide band transmission system including three radiative elements, comprising:
   receiving, by a space-time coding device, a block of nine data symbols ($S=(a_1,a_2,a_3,a_4,a_5,a_6,a_7,a_8,a_9)$) belonging to a pulse position modulation constellation or a pulse position and amplitude composite modulation constellation, having a number of time positions equal to 3 or greater than or equal to 5;
   coding, by the space-time coding device, the block of nine data symbols in nine vectors ($c_1^0, c_2^0, c_3^0, c_1^1, c_2^1, c_3^1, c_1^2, c_2^2, c_3^2$);
   using, by the space-time coding device, components of the vectors to modulate a ultra-wide band pulse signal for a radiative element of said system and for a given transmission interval ($T_f$), each vector being obtained from a distinct linear combination of three of said data symbols;
   applying, by the space-time coding device, a permutation of the components to a subset of said vectors ($c_1^2, c_1^1, c_2^2$) before modulating said ultra-wide band pulse signal; and
   transmitting, by at least one of said three radiative elements, said ultra-wide band pulse signal.

2. The space-time coding method according to claim 1, wherein said vectors having been subjected to said permutation are subjected to a sign reversal of one or more of its components before modulating said ultra-wide band pulse signal.

3. The space-time coding method according to claim 1, wherein said vectors are defined by $M \times 1$ block components of a matrix of size $3M \times 3$:

$$\begin{pmatrix} ua_1 + va_2 + wa_3 & ua_4 + va_5 + wa_6 & ua_7 + va_8 + wa_9 \\ \Omega(wa_7 + ua_8 + va_9) & wa_1 + ua_2 + va_3 & wa_4 + ua_5 + va_6 \\ \Omega(va_4 + wa_5 + ua_6) & \Omega(va_7 + wa_8 + ua_9) & va_1 + wa_2 + ua_3 \end{pmatrix}$$

with a permutation of the neighbouring lines or columns in which $a_1,a_2,a_3,a_4,a_5,a_6,a_7,a_8,a_9$ are said data symbols, M is an order of the pulse position modulation, $\Omega$ is a $M \times M$ permutation matrix of the components of said vectors, which may or may not have been subjected to a sign reversal of one or more of its coefficients ($\chi_i$), and coefficients u, v, w are such that their respective ratios are non-rational numbers.

4. The space-time coding method according to claim 3, wherein the coefficients u, v, w are proportional to±10% of the respective values $$-2 + 2\theta_0 + 3\theta_0^2,$$
$$-2 + 2\theta_1 + 3\theta_1^2,$$
$$-2 + 2\theta_2 + 3\theta_2^2 \text{ where}$$
$$\theta_q = 2\cos\left(\frac{2(q+1)\pi}{7}\right) \text{ for } q = 0, 1, 2.$$

5. The method of claim 1, further comprising:
   modulating, with the components of each of these nine vectors, the position, or the position and amplitude, of pulses composing a ultra-wide band pulse signal in order to obtain nine modulated ultra-wide band pulse signals; and
   transmitting, by said three radiative elements, said nine modulated ultra-wide band pulse signals during three consecutive transmission intervals.

6. The method according to claim 5, wherein the radiative elements are ultra-wide band antennas.

7. The method according to claim 5, wherein the radiative elements are laser diodes or electro-luminescent diodes.

8. The method according to claim 1, wherein said pulse signal is a time-hopped ultra-wide band signal.

9. The method according to claim 1, wherein said pulse signal is a direct-spread ultra-wide band signal.

10. The method according to claim 1, wherein said pulse signal is a time-hopped direct-spread ultra-wide band signal.

11. A space-time coding method for a ultra-wide band transmission system including four radiative elements, comprising:
    receiving, by a space-time coding device, a block of sixteen data symbols ($S=(a_1, \ldots, a_{16})$) belonging to a pulse position modulation constellation or a pulse position and amplitude composite modulation constellation, having a number of time positions equal to 3 or 5 or even greater than or equal to 7;
    coding, by the space-time coding device, the block of sixteen data symbols in sixteen vectors ($c_p^q$; $p=1, \ldots, 4$; $q=0, \ldots, 3$);
    using, by the space-time coding device, components of the vectors to modulate an ultra-wide band pulse signal for a radiative element of said system and for a given transmission interval ($T_f$), each vector being obtained from a distinct linear combination of four of said data symbols;
    applying, by the space-time coding device, a permutation of the components to a subset of said vectors ($c_1^3, c_1^2, c_2^3, c_1^1, c_2^2, c_3^3$) before modulating said ultra-wide band pulse signal; and
    transmitting, by at least one of said four radiative elements, said ultra-wide band pulse signal.

12. The space-time coding method according to claim 11, wherein said vectors having been subjected to said permutation are subjected to a reversal of one or more of the components before modulating said ultra-wide band pulse signal.

13. The space-time coding method according to claim 11, wherein said vectors are defined by the $M \times 1$ block components of a matrix of size $4M \times 4$:

$$C = \begin{pmatrix} c_1^0 & c_2^0 & c_3^0 & c_4^0 \\ c_1^1 & c_2^1 & c_3^1 & c_4^1 \\ c_1^2 & c_2^2 & c_3^2 & c_4^2 \\ c_1^3 & c_2^3 & c_3^3 & c_4^3 \end{pmatrix} \text{ where}$$

$c_1^0 = u_0 a_1 + v_0 a_2 + w_0 a_3 + t_0 a_4$      $c_2^0 = u_0 a_5 + v_0 a_6 + w_0 a_7 + t_0 a_8$ $c_1^1 = \Omega(u_1 a_{13} + v_1 a_{13} + w_1 a_{15} + t_1 a_{16})$      $c_2^1 = u_1 a_1 + v_1 a_2 + w_1 a_3 + t_1 a_4$ $c_1^2 = \Omega(u_2 a_9 + v_2 a_{10} + w_2 a_{11} + t_2 a_{12})$      $c_2^2 = \Omega(u_2 a_{13} + v_2 a_{13} + w_2 a_{15} + t_2 a_{16})$ $c_1^3 = \Omega(u_3 a_5 + v_3 a_6 + w_3 a_7 + t_3 a_8)$      $c_2^3 = \Omega(u_3 a_9 + v_3 a_{10} + w_3 a_{11} + t_3 a_{12})$ $c_3^0 = u_0 a_9 + v_0 a_{10} + w_0 a_{11} + t_0 a_{12}$      $c_4^0 = u_0 a_{13} + v_0 a_{13} + w_0 a_{15} + t_0 a_{16}$ $c_3^1 = u_1 a_5 + v_1 a_6 + w_1 a_7 + t_1 a_8$      $c_4^1 = u_1 a_9 + v_1 a_{10} + w_1 a_{11} + t_1 a_{12}$ $c_3^2 = u_2 a_1 + v_2 a_2 + w_2 a_3 + t_2 a_4$      $c_4^2 = u_2 a_5 + v_2 a_6 + w_2 a_7 + t_2 a_8$ $c_3^3 = \Omega(u_3 a_{13} + v_3 a_{14} + w_3 a_{15} + t_3 a_{16})$      $c_4^3 = u_3 a_1 + v_3 a_2 + w_3 a_3 + t_3 a_4$ with a permutation of the neighbouring lines and/or columns in which $a_1, \ldots, a_{16}$ are said data symbols, M is a order of the pulse position modulation, $\Omega$ is a M×M permutation matrix of the components of said vectors, which may or may not have been subjected to a sign reversal of one or more of its coefficients ($\chi_i$), and coefficients $u_q, v_q, w_q, t_q$ are proportional to ±10% of the respective values 1;

$-1 - 3\phi_q + \phi_q^2 + \phi_q^3;$ $-1 - 2\phi_q + \phi_q^2 + \phi_q^3;$ $-1 + 3\phi_q - \phi_q^3$ with $\phi_q = 2\cos\left(\frac{2(q+1)\pi}{15}\right)$ for $q = 0, \ldots, 3$.

14. The method of claim 11, further comprising:
modulating with the components of each of these sixteen vectors, the position, or the position and amplitude, of pulses composing an ultra-wide band pulse signal in order to obtain sixteen modulated ultra-wide band pulse signals; and
transmitting, by said four radiative elements, said sixteen signals during four consecutive transmission intervals.

15. A space-time coding device for an ultra-wide band transmission system, the space-time coding device comprising:
three radiative elements;
a receiver that receives a block of nine data symbols S=($a_1$, $a_2, a_3, a_4, a_5, a_6, a_7, a_8, a_9$)) belonging to a pulse position modulation constellation or a pulse position and amplitude composite modulation constellation, having a number of time positions equal to 3 or greater than or equal to 5;
a coding module that codes the block of nine data symbols in nine vectors ($c_1^0, c_2^0, c_3^0, c_1^1, c_2^1, c_3^1, c_1^2, c_2^2, c_3^2$); and
a permutation module that modulates components of the vectors to modulate an ultra-wide band pulse signal for one of the radiative elements and for a given transmission interval ($T_f$), each vector being obtained from a distinct linear combination of three of said data symbols, and that applies a permutation of the components to a subset of said vectors ($c_1^2, c_1^1, c_2^2$) before modulating said ultra-wide band pulse signal.

16. The space-time coding device of claim 15, wherein
the coding module includes at least one linear combination module, and each linear combination module performs three distinct linear combinations of the components of a same rank, and
the space-time coding device further includes a demultiplexer that receives the components of said vectors or the components of said vectors permuted by the permutation module to provide said nine vectors in a group of three by three consecutive times.

17. The space-time coding device according to claim 15, wherein the coding module or the permutation module includes, at an input, a serial-parallel converter that converts a sequence of M components into a word of M symbols constituted by said M components and, at an output, a parallel-serial converter.

18. The space-time coding device according to claim 15, wherein the permutation module includes a buffer that stores the components, and means for mixing read and write addresses of said buffer.

19. A space-time coding device for an ultra-wide band transmission system, the space-time coding device comprising:
four radiative elements,
a receiver that receives a block of sixteen data symbols (S=($a_1, \ldots, a_{16}$)) belonging to a pulse position modulation constellation or a pulse position and amplitude composite modulation constellation, having a number of time positions equal to 3 or 5 or even greater than or equal to 7;
a coding modules that codes the block of sixteen data symbols in sixteen vectors ($c_p^q$; p=1, ..., 4; q=0, ..., 3); and
a permutation module that modulates components of the vectors to modulate an ultra-wide band pulse signal for one of the radiative elements and for a given transmission interval ($T_f$), each vector being obtained from a distinct linear combination of four of said data symbols, and that applies a permutation of the components to a subset of said vectors ($c_1^3, c_1^2, c_2^3, c_1^1, c_2^2, c_3^3$) before modulating said ultra-wide band pulse signal.

20. The space-time coding device of claim 19, wherein
the coding module includes at least one linear combination module, and each linear combination module performs four distinct linear combinations of the components of a same rank, and the space-time coding device further includes a demultiplexer that receives the components of said vectors or the components of the vectors permuted by the permutation module to provide said nine vectors in a group of four by four consecutive times.

21. The space-time coding device according to claim 19, wherein the coding module or the permutation module includes, at an input, a serial-parallel converter that converts a sequence of M components into a word of M symbols constituted by said M components and, at an output, a parallel-serial converter.

22. The space-time coding device according to claim 19, wherein the permutation module includes a buffer that stores the components, and means for mixing read and write addresses of said buffer.

23. A space-time coding device for an ultra-wide band transmission system, the space-time coding device comprising:

three radiative elements;

means for receiving a block of nine data symbols ($S=(a_1, a_2, a_3, a_4, a_5, a_6, a_7, a_8, a_9)$) belonging to a pulse position modulation constellation or a pulse position and amplitude composite modulation constellation, having a number of time positions equal to 3 or greater than or equal to 5;

means for coding the block of nine data symbols in nine vectors ($c_1^0, c_2^0, c_3^0, c_1^1, c_2^1, c_3^1, c_1^2, c_2^2, c_3^2$);

means for using components of the vectors to modulate an ultra-wide band pulse signal for one of the radiative elements of said system and for a given transmission interval ($T_f$), each vector being obtained from a distinct linear combination of three of said data symbols;

means for applying a permutation of the components to a subset of said vectors ($c_1^2, c_1^1, c_2^2$) before modulating said ultra-wide band pulse signal.

24. A space-time coding device for an ultra-wide band transmission system, the space-time coding device comprising:

four radiative elements;

means for receiving a block of sixteen data symbols ($S=(a_1, \ldots, a_{16})$) belonging to a pulse position modulation constellation or a pulse position and amplitude composite modulation constellation, having a number of time positions equal to 3 or 5 or even greater than or equal to 7;

means for coding the block of sixteen data symbols in sixteen vectors ($c_p^q$; $p=1, \ldots, 4$; $q=0, \ldots, 3$);

means for using components of the vectors to modulate an ultra-wide band pulse signal for one of the radiative elements of said system and for a given transmission interval ($T_f$), each vector being obtained from a distinct linear combination of four of said data symbols; and means for applying a permutation of the components to a subset of said vectors ($c_1^3, c_1^2, c_2^3, c_1^1, c_2^2, c_3^3$) before modulating said ultra-wide band pulse signal.

* * * * *